July 21, 1925.                    W. R. STRICKLAND                    1,547,133
                                OPERATING MECHANISM
                    Original Filed Dec. 10, 1923      2 Sheets-Sheet 2
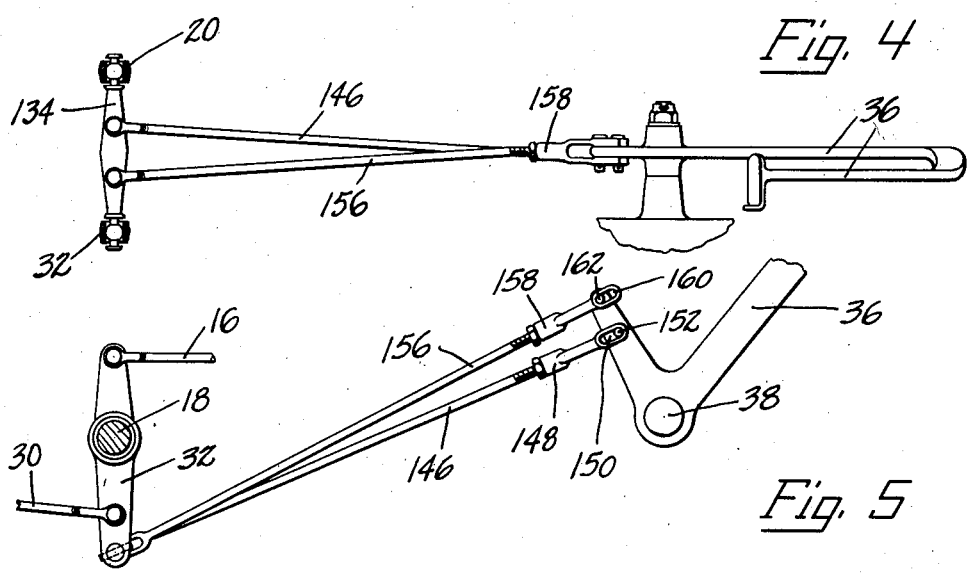
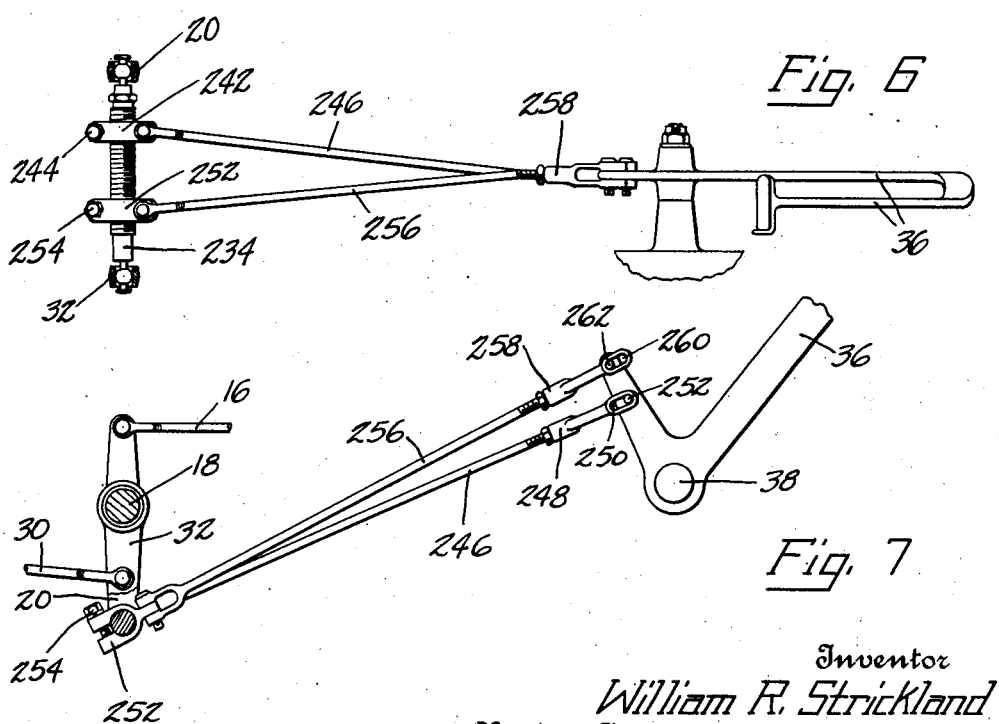
Inventor
William R. Strickland
By his Attorneys Patented July 21, 1925.

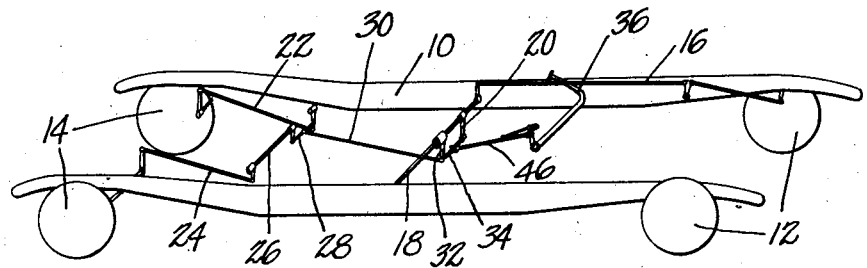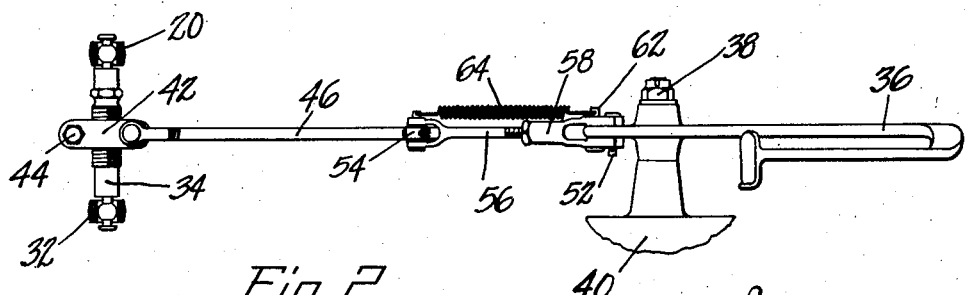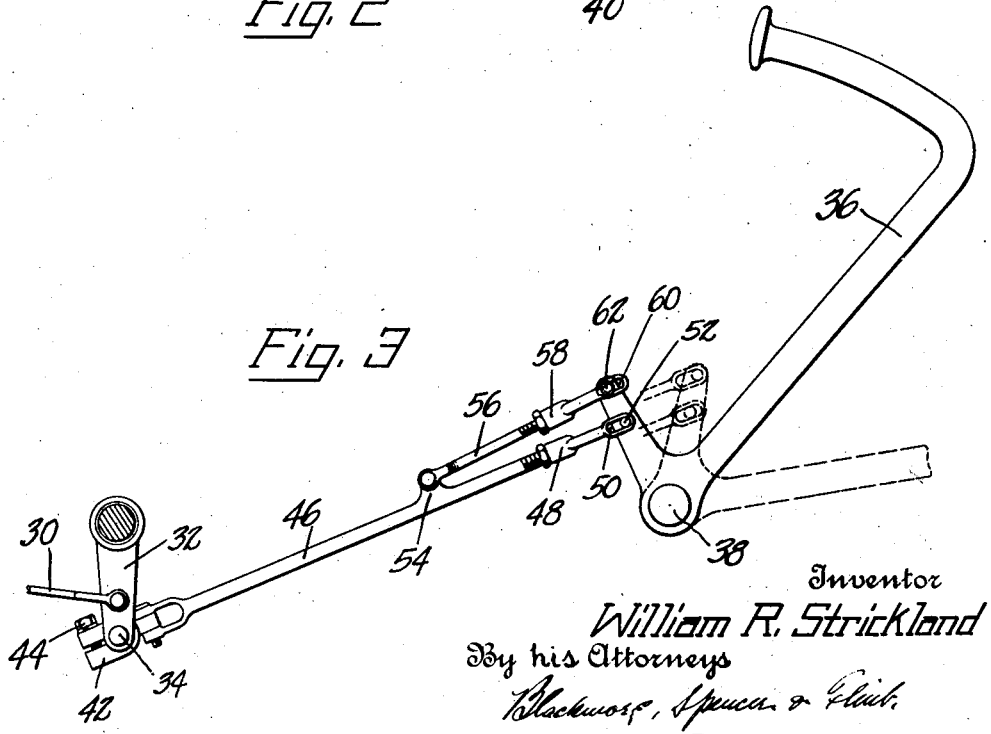

1,547,133

UNITED STATES PATENT OFFICE.

WILLIAM R. STRICKLAND, OF DETROIT, MICHIGAN, ASSIGNOR TO GENERAL MOTORS CORPORATION, OF DETROIT, MICHIGAN, A CORPORATION OF DELAWARE.

OPERATING MECHANISM.

Application filed December 10, 1923, Serial No. 679,665. Renewed May 14, 1925.

*To all whom it may concern:*

Be it known that I, WILLIAM R. STRICKLAND, a citizen of the United States, and a resident of Detroit, county of Wayne, and State of Michigan, have invented certain new and useful Improvements in Operating Mechanism, of which the following is a full, clear, concise, and exact description, such as will enable others skilled in the art to which the invention relates to make and use the same, reference being made therein to the accompanying drawings, which form a part of this specification.

This invention relates to mechanism constructed and arranged to operate in two distinct stages, and is illustrated as embodied in brake-operating connections for a motor vehicle.

In operating such devices as motor vehicle brakes, it is necessary to make sure that the brake pedal, or equivalent lever, does not reach its limit of movement (determined by the floor board for a brake pedal) before the maximum operating effect has been achieved. Due to such changes as wear of brake linings, etc., the maximum stroke of such levers gradually increases during use, and it is usually necessary either to adjust the connections frequently or to allow, in adjusting the connections in the first place, for a considerable extra movement.

An object of this invention, in one of its modifications, is to obviate the frequent adjustments without making it necessary to allow for any substantial extra range of movement, by providing connections operating in two distinct stages. When used with brakes, preferably the first stage of movement is sufficient, before the brake linings become badly worn, to apply the brakes effectively but without locking the wheels, and the second stage of movement, which is much more rapid, is intended to apply the brakes effectively, even to locking the wheels, regardless of the condition and adjustment of the parts of the brake. Moreover, the additional force required during the second stage of movement warns the driver that his brakes need attention if he finds it necessary to use it, and provides a yielding stop for ordinary operation.

In one desirable arrangement, there are two links connected to the pedal or other lever at different distances from its fulcrum, as, for example, by oppositely-effective pin-and-slot or other lost motion connections, so that during the first stage of operation the link connected to be operated by the shorter lever arm is effective, while during the second stage the link operated by the longer arm becomes effective. In the first modification shown in the drawings, the two links are pivotally connected to each other, and are arranged to operate an equalizer bar.

A further object of the invention is to provide a modification of the above-described connections, operating on the same principle, but adapted to vary the application of different brakes, so that in a first stage the force is distributed in one manner, while it is differently distributed during the second stage of operation. Such an arrangement is desirable, for example, when there are front and rear sets of brakes, so that the part of the force applied to each set is changed if it becomes necessary to apply the brakes to their utmost extent. In the illustrated arrangement, advantage is taken of such a modified construction to allow additional pressure on the rear wheel brakes without increase of pressure on the front wheel brakes, after a predetermined point is reached, to permit maximum braking on the rear wheels without danger of locking the front wheels, with consequent possibility of loss of steering control and of dangerous skidding.

The above and other objects and features of the invention, including various novel and desirable particular constructions, will be apparent from the following description of one illustrative embodiment shown in the accompanying drawings, in which Fig. 1 is a diagrammatic perspective view of a motor vehicle chassis having brakes operated by the described novel connections;

Fig. 2 is a top plan view of the brake pedal and its associated connections;

Fig. 3 is a side elevation of the parts shown in Fig. 2;

Figs. 4 and 6 are views corresponding to Fig. 2, but showing modifications; and

Figs. 5 and 7 are views corresponding to Fig. 3, but showing the connections of Figs. 4 and 6, respectively.

In the particular arrangements shown in the drawings, the invention in several illustrative forms is embodied in a motor vehicle chassis having a frame 10, front brakes 12, and rear brakes 14. The front brakes are connected by links 16 to opposite ends of a rock shaft 18 operated by an arm 20 keyed thereto. The rear brakes are operated by links 22 and 24, the latter connected to a rock shaft 26, together with an equalizer 28 connected by a link 30 to an arm 32 freely sleeved on rock shaft 18. The above-described parts or their equivalents may be of any suitable construction, those illustrated being described in detail in application S. N. 674,235, filed Nov. 12, 1923, by E. W. Seaholm.

In the arrangement shown in Figs. 1, 2 and 3, the brakes are operated by an equalizer 34 connected in a novel manner to a brake pedal 36 pivoted at 38 on the transmission housing 40, or other suitable support. A split sleeve 42 is adjustably clamped by a binding screw 44 on a threaded central section of the equalizer 34, to permit variation in the proportions of the force transmitted to the rear and front brakes, and is pivotally connected to a link 46 having an adjustable bifurcated head 48 provided with slots 50 in its opposite arms, which slots embrace the ends of a pin 52 carried by the brake pedal 36. In the idle position of the pedal, shown in full lines in Fig. 3, the front ends of slots 50 are in engagement with pin 52.

Pivotally connected to a lug 54 formed on link 46 is a second link 56 having an adjustable bifurcated head 58, provided with slots 60 in its opposite arms, which slots embrace the ends of a second pin 62 carried by the brake pedal 36. It will be noted that pin 52 is nearer the fulcrum 38 than pin 62, and thus moves more slowly and on a shorter lever arm. Pin 62 is shown engaged by the rear ends of slots 60 when pedal 36 is in idle position, but there may be clearance at this point. A spring 64 connecting pin 62 and the pivotal connection between links 46 and 56 is provided to prevent rattle of the various parts.

In operation, during the first stage,—that is, during normal operation of the brakes,—pedal 36 operates through pin 52, link 46, and equalizer 34, to apply the brakes. At this time pin 62 has just reached the front ends of slots 60, and the longer lever arm so effective through link 56 requires greater power, thus providing a yielding stop. If it becomes necessary to lock the wheels, or if the brake linings become badly worn, a very small further depression of pedal 36, which, however, requires considerable power, operates through pin 62, links 56 and 46, and equalizer 34, to transmit additional power before the pedal reaches the end of its travel. At this time pin 52 rides idly back in slots 50 as shown in dotted lines in Fig. 3.

The modifications shown respectively in Figs. 4 and 5, and in Figs. 6 and 7, are especially adapted for use with four wheel brakes. In Figs. 4 and 5 an equalizer bar 134 is connected to arms 20 and 32, and is arranged to be operated by pedal 36 in such a manner as to apply at first more force to the front than to the rear brakes. At this time the pedal pulls on link 146, connected to equalizer bar 134 nearer arm 20 than arm 32, link 146 having a head 148 provided with slots 150 engaging a pin 152 on the pedal. At a predetermined point, the pull from the pedal is taken over by a link 156, connected to equalizer bar 134 nearer arm 32 than arm 20, so that more force is applied to the rear than to the front brakes. Link 156 has a head 158 provided with slots 160 which at this time engage a pin 162 on the brake pedal.

In Figs. 6 and 7, the pedal is connected to the brakes by two links adjustably secured to an equalizer bar 234. Link 246 is pivoted to a member 242 adjustably clamped by a screw 244 to a threaded part of the bar, and has a head 248 provided with slots 250 embracing a pin 252 on the brake pedal. Link 256 is pivoted to a member 252 clamped by a screw 254 to the bar, and is provided with a head 258 having slots 260 embracing a pin 262 on the pedal. The pedal operates as explained above, first through link 246 and then through link 256.

In the ordinary operation of the brakes shown in Figs. 4–7, most of the braking is on the front wheels. If, however, the pedal is jammed down past the yielding stop provided by the change in leverage, the rear wheel brakes are applied to a much greater extent, with comparatively little additional braking on the front wheels.

While several embodiments of my invention have been described in detail, it is not my intention to limit its scope to those embodiments, or otherwise than by the terms of the appended claims, as obviously it may be embodied in other mechanism and may be used to operate other devices than brakes.

I claim:

1. An operating device comprising, in combination, a lever, and a pair of links connected to the lever by spaced connections arranged in such a manner that the connection nearest the fulcrum of the lever transmits force from the lever to its link during the first part of the movement of the lever and then serves as a lost-motion device, while the connection furthest from the fulcrum serves as a lost-motion device until it overtakes the first connection and thereafter transmits force from the lever to the second link.

2. An operating device comprising, in combination, a lever, a link having a pin-and-slot connection therewith, and a second link also having a pin-and-slot connection with the lever at a point more remote from the fulcrum of the lever, the connections being so constructed and arranged that the respective links transmit force from the lever during different parts of its stroke, substantially as described.

3. An operating device comprising, in combination, a lever, a link having a pin-and-slot connection therewith, and a second link also having a pin-and-slot connection with the lever at a point more remote from the fulcrum of the lever, the pins of the respective connections being in opposite ends of their slots when the lever is in its idle position.

4. An operating device comprising, in combination, a lever having a pair of pins at different distances from its fulcrum, a link having a slot embracing the pin nearest the fulcrum and with the front end of the slot engaging the pin with the lever in idle position, and a second link having a slot embracing the pin furthest from the fulcrum and with the rear end of its slot engaging the pin with the lever in idle position.

5. An operating device comprising, in combination, a lever having a pair of pins at different distances from its fulcrum, a link having a slot embracing the pin nearest the fulcrum and with the front end of the slot engaging the pin with the lever in idle position, a second link having a slot embracing the pin furthest from the fulcrum and with the rear end of its slot engaging the pin with the lever in idle position, and a connection between the two links.

6. Brake mechanism comprising, in combination, a brake pedal, an equalizer, and connections therebetween including a link pivoted to the equalizer and having a slot embracing a pin on the brake pedal with its front end engaging the pin when the pedal is in idle position, and a second link pivoted to the first link and having a slot embracing a second pin on the brake pedal further from the fulcrum than the first pin, the rear end of the slot engaging the second pin when the pedal is in idle position.

7. A vehicle having, in combination, a plurality of brakes, a brake-controlling member, and a plurality of succesively-effective connections from said member arranged differently to distribute the force to the various brakes.

8. A vehicle having, in combination, front and rear brakes, a brake-controlling member, a connection from said member to distribute the force between the two sets of brakes, and an auxiliary connection from said member effective after the first connection to distribute the force differently between the two sets of brakes.

9. A vehicle having, in combination, front and rear brakes, a brake-controlling member, a connection from said member for applying the brakes with more force on the front than on the rear brakes, and an auxiliary connection from said member for applying the brakes with more force on the rear than on the front brakes.

10. A vehicle having, in combination, a plurality of brakes, an equalizer bar to distribute force thereto, a brake-controlling member, and connections automatically adjustable to apply force from said member at different points on the equalizer bar.

11. Operating connections comprising, in combination, an equalizer bar, a controlling member, and successively-effective connections from said member attached to the equalizer bar at different points.

12. Operating connections comprising, in combination, an equalizer bar, a controlling member, and a pair of devices connecting said member to the bar at different points in its length.

13. Operating connections comprising, in combination, an equalizer bar, a controlling member, and a pair of devices connecting said member to the bar at different points in its length, said devices being successively effective.

14. Operating connections comprising, in combination, an equalizer bar, a controlling member, and a pair of devices connecting said member to the bar at different points in its length, said devices being connected to the member at different points.

15. Operating connections comprising, in combination, an equalizer bar, a controlling lever, and a pair of successively-effective devices connected to the equalizer bar and connected to the lever at different distances from its fulcrum.

16. Operating connections comprising, in combination, an equalizer bar, a controlling lever, and a pair of successively-effective devices connected to the equalizer bar at different points in its length and connected to the lever at different distances from its fulcrum.

17. Operating connections comprising, in combination, an equalizer bar, a controlling lever, and a pair of links pivoted to the equalizer bar and having pin-and-slot connection with said lever at different distances from its fulcrum.

18. Operating connections comprising, in combination, an equalizer bar, a controlling lever, and a pair of links pivoted to the equalizer bar at different points in its length and having pin-and-slot connection with said lever at different distances from its fulcrum 19. Operating connections comprising, in combination, an equalizer bar, a controlling lever, and a pair of links adjustably secured to the bar and having lost-motion connection with the lever at different distances from its fulcrum.

In testimony whereof I affix my signature.

WILLIAM R. STRICKLAND.